(12) United States Patent
Tang et al.

(10) Patent No.: US 8,005,559 B2
(45) Date of Patent: Aug. 23, 2011

(54) OPTIMIZING TASK ASSIGNMENTS FOR MULTI-HEAD TAPE LAYDOWN

(75) Inventors: Wei-Pai Tang, Redmond, WA (US); Robert A. Kisch, Auburn, WA (US)

(73) Assignee: The Boeing Company, Chicago, IL (US)

( * ) Notice: Subject to any disclaimer, the term of this patent is extended or adjusted under 35 U.S.C. 154(b) by 617 days.

(21) Appl. No.: 11/861,624

(22) Filed: Sep. 26, 2007

(65) Prior Publication Data

US 2009/0082891 A1     Mar. 26, 2009

(51) Int. Cl.
*G06F 19/00* (2006.01)

(52) U.S. Cl. .......... 700/100; 156/64; 156/358; 156/361

(58) Field of Classification Search .............. 700/100; 156/64, 358, 361; 3/100
See application file for complete search history.

(56) References Cited

U.S. PATENT DOCUMENTS

| | | | |
|---|---|---|---|
| 4,707,212 A * | 11/1987 | Hailey et al. ............... | 156/361 |
| 4,849,913 A * | 7/1989 | Ward et al. .................. | 700/98 |
| 4,900,379 A * | 2/1990 | Chapman ..................... | 156/64 |
| 5,006,990 A * | 4/1991 | Ward et al. .................. | 700/97 |
| 6,591,232 B1 * | 7/2003 | Kassapoglou ................ | 703/2 |
| 6,843,565 B2 * | 1/2005 | Evans et al. ................. | 353/28 |
| 7,376,480 B2 | 5/2008 | Hagen | |
| 2004/0021828 A1 * | 2/2004 | Evans et al. ................. | 353/28 |
| 2005/0247396 A1 * | 11/2005 | Oldani et al. ............... | 156/173 |
| 2006/0052893 A1 * | 3/2006 | Yamazaki et al. ........... | 700/100 |
| 2007/0095451 A1 * | 5/2007 | Kramp ......................... | 156/64 |
| 2007/0144676 A1 | 6/2007 | Tang | |
| 2007/0150087 A1 | 6/2007 | Tang | |
| 2007/0187024 A1 * | 8/2007 | Johnson et al. ............. | 156/250 |
| 2007/0194175 A1 | 8/2007 | Kismarton | |
| 2009/0084486 A1 * | 4/2009 | Tang et al. .................. | 156/64 |

* cited by examiner

*Primary Examiner* — Michael D Masinick
(74) *Attorney, Agent, or Firm* — Tung & Associates (57) ABSTRACT

The operation of automated tape heads used to layup a composite structure is optimized in order to reduce layup time and better balance tape head loading. Ply data is generated that defines the ply segments and tape courses for each sequence of the layup. Each sequence is partitioned into groups of either ply segments or tape courses for the sequence. Multiple possible tape head assignments are generated in which the individual tape heads are assigned to the groups A final set of tape head assignments are selected based on the assignments that minimize the time required to complete the layup.

10 Claims, 7 Drawing Sheets

OPTIMIZING TASK ASSIGNMENTS FOR MULTI-HEAD TAPE LAYDOWN

CROSS REFERENCE TO RELATED APPLICATIONS

This application is related to U.S. patent application Ser. No. 11/269,905 filed Nov. 9, 2005; U.S. patent application Ser. No. 11/315,101 filed Dec. 23, 2005 and published as US-2007-0144676-A1 on Jun. 28, 2007; U.S. patent application Ser. No. 11/315,103, filed Dec. 23, 2005 and published as US-2007-0150087-A1 on Jun. 28, 2007; U.S. patent application Ser. No. 11/862,350 filed Sep. 12, 2007; and, U.S. patent application Ser. No. 11/859,125 filed Sep. 21, 2007, the entire disclosures of which are incorporated by reference herein.

TECHNICAL FIELD

This disclosure broadly relates to methods for fabricating composite structures, especially using automated material application machines, and deals more particularly with a method for optimizing machine loading in order to reduce the time required to complete a composite structure layup.

BACKGROUND

Composite parts and structures such as those used in the automotive, marine and aerospace industries may be fabricated using automated composite material application machines, such as composite tape lamination machines and composite fiber placement machines, all referred to herein tape laydown machines.

Tape laydown machines may employ single or multiple composite material application heads operated by NC (numerical control) or computer numerical control (CNC) controllers that control movement of the head as well as ancillary functions, including applying and cutting tape "on the fly". In aerospace applications, these machines may be used to fabricate a wide variety of composite parts, such as flat spars, stringer charges, wing skins and fuselage barrel sections, to name a few.

Composite parts of the type mentioned above comprise multiple tape plies of varying thickness, complexity, and fiber orientation. Application of the tape is broken down into sequences, each of which may comprise a single ply or one or more individual pieces called ply segments, also sometimes referred to as ply "doublers". The ply segments in a sequence (layer) often have differing fiber orientations, but may have the same fiber orientation. All ply segments laid in a sequence are normally in place on the part before material application proceeds to the next sequence. The part is complete when all sequences have been placed.

Path generation software may be provided that automatically controls and coordinates the movements of multiple tape application heads, including the order in which ply segments are laid down. This software partitions the ply segments and assigns tape heads to lay down particular ply segments. The partitioning process and tape head assignment is selected by the software programmer based on a few simple rules, personal experience and/or intuition. In some cases, the programmer may choose tape head assignments that may result in one or more tape heads being idle for periods of time, thereby reducing layup rate and adding to the time required to complete a composite structure layup.

Accordingly, there is a need for a method of optimizing task assignment for multiple tape heads which increases the rate of tape application and reduces the time required to complete a layup. Embodiments of the disclosure are intended to satisfy this need.

SUMMARY

Embodiments of the disclosure provide a method of optimizing the loading on multiple tape application heads used to laydown successive sequences of a composite structure layup. The method reduces idle time of tape heads by assigning the tape heads to partitioned ply segments or tape courses that form a sequence. By reducing idle time of the tape heads, the overall rate of tape laydown is increased due to the parallel efficiency of the tape heads.

According to one disclosed embodiment, a method is provided of optimizing the loading on a plurality of automated tape application machines used to layup a composite structure in ply sequences, comprising the steps of: partitioning each sequence into groups of ply segments; generating multiple sets of possible machines assignments to the groups, wherein for each group, at least one of the machines is assigned to laydown the ply segments in the group; and, selecting one of the sets of possible machine assignments that optimizes the loading on the machines. The method may further comprise determining the time required to complete layup of a sequence using each of the sets of possible machines assignments. The method may also include the step of, for each of the possible machines assignments, determining whether any of the machines may collide with each other. The ply sequence may be partitioned by partitioning the ply segments into groups. The method may also include generating ply data representing the layout of ply segments and tape courses in each of the sequences.

According to another disclosed embodiment, a method is provided of laying up a composite structure using a plurality of automated, composite tape application heads, comprising the steps of: generating sequence data representing the shape and location of ply segments and the paths of composite tape courses for each sequence of the layup; analyzing the shape and location of the ply segments using the generated sequence data; partitioning the sequence into groups of tape courses based on the analysis of the ply segments; and, assigning the tape heads to laydown the tape courses in the groups such that nonproductive, idle time of the tape heads is minimized. The method may also include determining whether the assignments may result in a collision between any of the tape heads, and if a possibility of collision is determined, then making a reassignment of at least one tape head to another group. The assignment of the tape heads may include determining the time required for the tape heads to complete layup of a sequence.

In another disclosed embodiments, a method is provided for optimizing the efficiency of multiple, automated composite tape application heads used to layup a composite part. The method comprises the steps of: receiving a set of tape course paths used for forming one or more ply segments of a sequence in the layup; partitioning the tape courses into groups; assigning each of the tape heads to one or more of the groups such that each of the tape heads lays down the tape courses in the one or more groups to which the tape head is assigned, and wherein the tape head assignments are distributed among the groups such that loading on the tape heads is essentially equalized. The method may further comprise the steps of generating a set of sequence data defining the tape courses and the location of the ply segments, and generating the set of tape course paths using the generated sequence data.

According to a further disclosed embodiment, a method is provided of optimizing the operation of multiple automated tape heads used to laydown a ply sequence in a composite structure layup, comprising the steps of: providing ply data defining the layout of one or more one ply segments formed by tape courses in the sequence; partitioning the one or more ply segments or tape courses into groups; making an initial assignment of the tape heads to the groups, wherein a tape head initially assigned to a group lays up the tape courses for one or more of the groups; determining the time required for the tape heads to laydown the ply sequence; and, reassigning the tape heads to the groups until the time determined to laydown the ply sequence is minimized. The method may also include determining whether any of the tape heads may collide with each other, and reassigning the tape heads to the groups if it is determined that a tape head collision is possible. The method may further include the step of generating a set of programmed instructions for controlling the movements of the tape heads based on the tape head reassignments.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Referring first to FIGS. 1-5, a composite fuselage 2 (FIGS. 3 and 4) comprises a plurality of composite material sequences, e.g. 32a, 32b, each containing a single layer or ply of composite material that form the fuselage 2. Each layer or ply may include one or more pieces 34 which will be referred to herein as ply segments, also sometimes referred to in the art as "doublers". The ply segments 34 may often be formed of composite tape having differing fiber orientations, although the tape courses for the same ply segment normally have the same fiber orientation.

Figure 3:
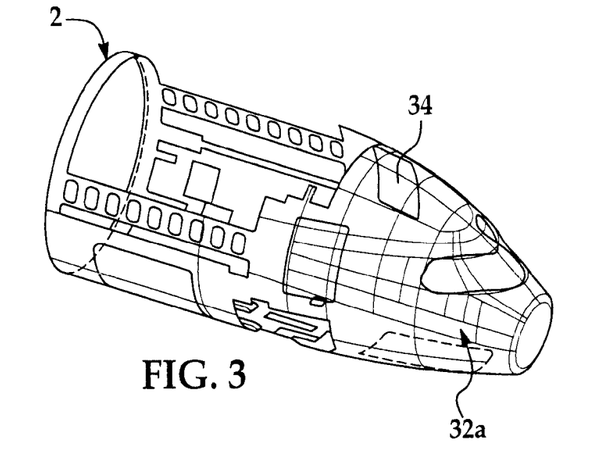
FIG. 3 is an isometric illustration of a layup sequence for an aircraft fuselage, comprising a single ply segment.
Figure 4:
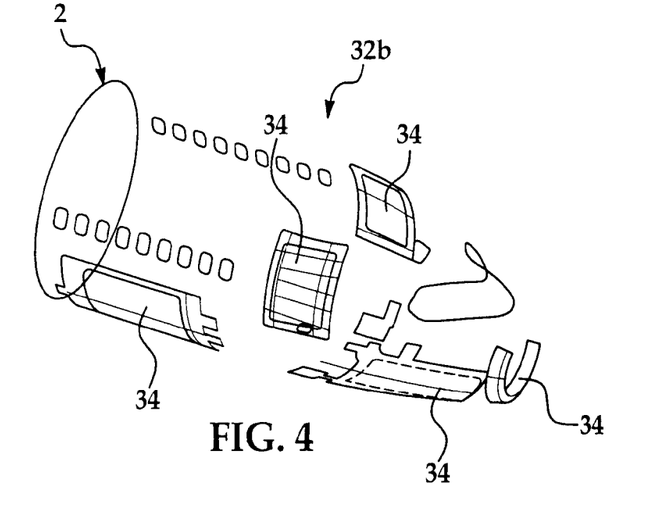
FIG. 4 is a view similar to FIG. 3 but showing another layup sequence comprising multiple ply segments.

As shown in FIG. 3, a sequence 32a may comprise a single, large ply segment 34 or, as shown in FIG. 4, a sequence 32b may comprise multiple, separate ply segments 34 of simple or complex configurations.

Figure 2:
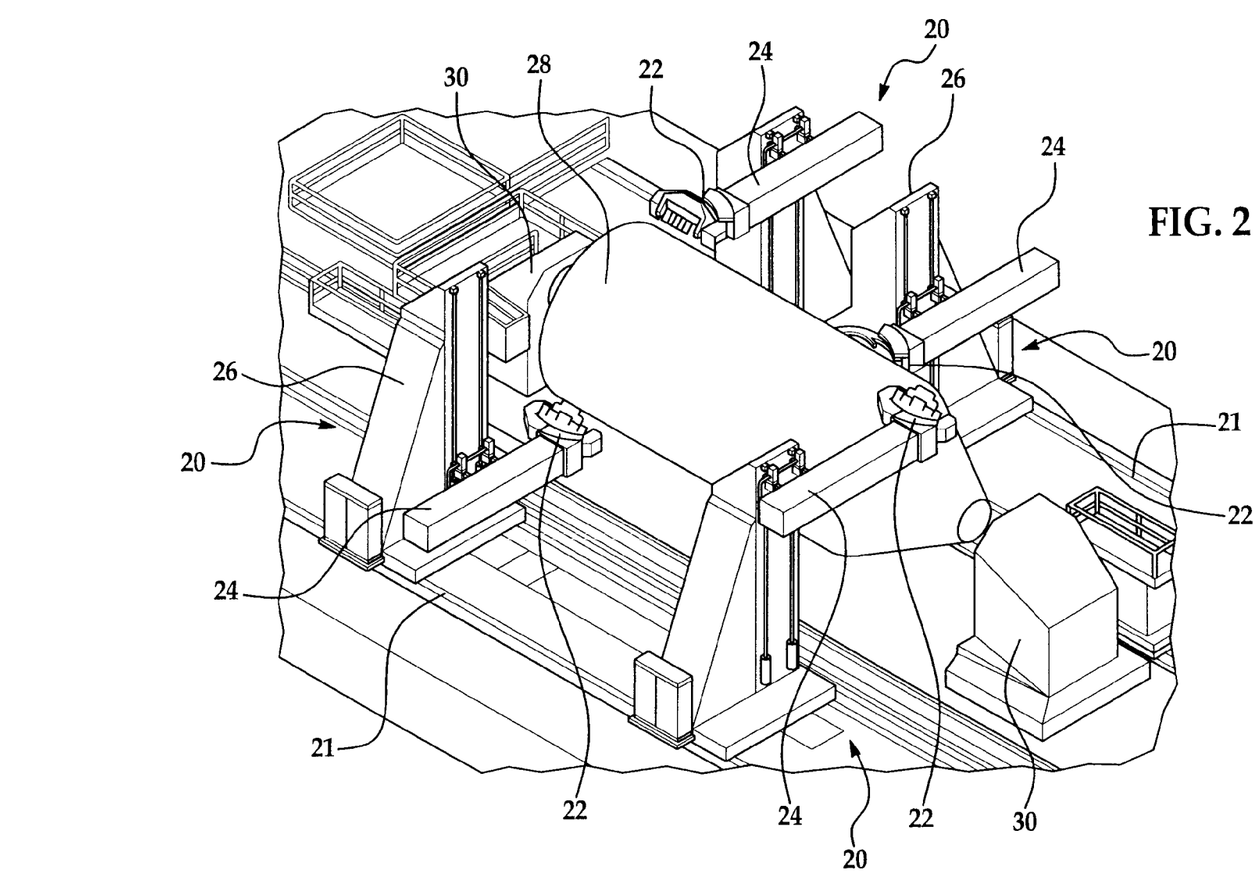
FIG. 2 is an isometric illustration of an operation for laying up a composite structure using multiple, automated tape application heads.
Figure 10:
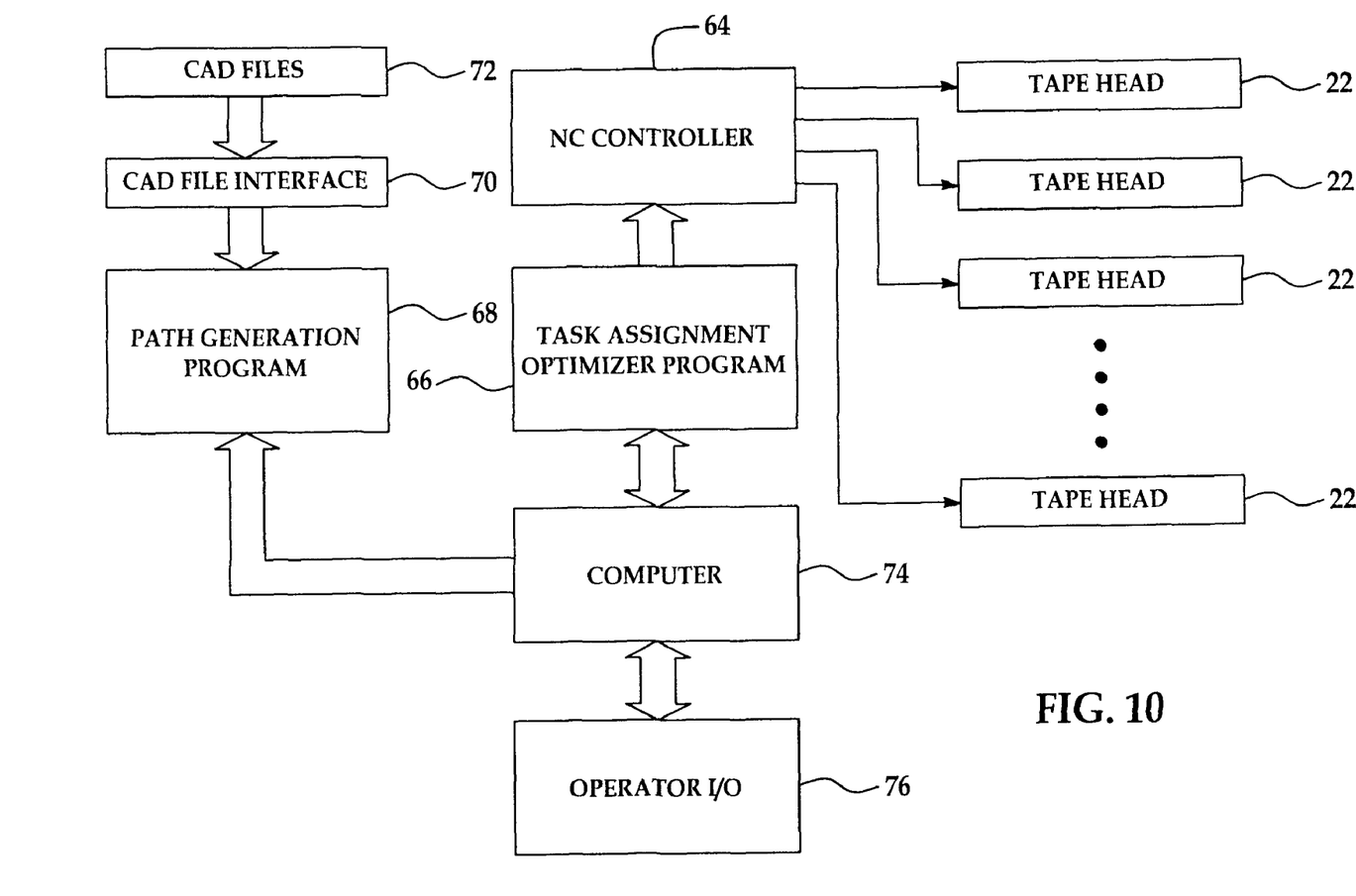
FIG. 10 is a block diagram illustrating components of a system for carrying out the method embodiments.

Referring particularly to FIG. 2, the composite fuselage 2 may be laid up on a tool such as a cylindrical mandrel 28 by multiple, automated tape application machines 20 mounted on tracks or rails 21 for linear movement, parallel to the axis of the mandrel 28. Each of the tape application machines 20 may include a tape application head 22 that is moveable along multiple axes to allow placement of composite tape at desired locations, and desired orientations on the mandrel 28. The mandrel 28 may be mounted for rotation on supports 30 to facilitate tape application around the entire circumference of the mandrel 28. Rotation of the mandrel 28 and the operation of the tape application machines 20 may be automatically controlled by an NC (numeric control) or CNC (computer numeric control) controller 64 (FIG. 10).

As will be discussed later, the NC controller 64 may be operated by a set of programmed instructions for controlling and coordinating the movement of the tape heads 22, as well as ancillary functions such as tape feed and tape cutoff. The tape application machines 20 may be of any of several types that apply composite tapes from spools (not shown) which supply composite tape having a standard width such as 3 or 6 inches, or a nonstandard width such as ⅛ inch or ¼ inch, commonly referred to as "tows".

Figure 5:
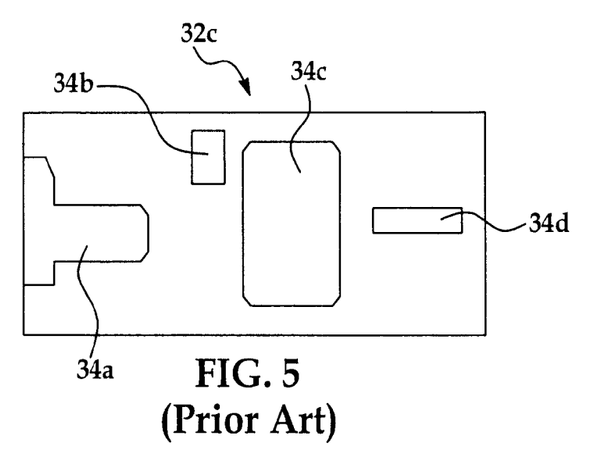
FIG. 5 illustrates a prior art technique for manually assigning tape heads to ply segments in a layup sequence.

A previously discussed, the prior art technique for coordinating the movements of the tape heads 22 relied on a NC programmer to manually assign (program) each of the tape heads 22 with the task of laying up one or more particular ply segments 34. For example, as shown in FIG. 5, a ply sequence 32c comprises ply segments 34a, 34b, 34c, and 34d. The NC programmer may assign a first tape head to laydown ply segment 34a, a second tape head to laydown both ply segments 34b and 34c, and a third tape head to laydown ply segment 34d. Since ply segment 34d may be relative small and simple, compared to ply segments 34a, 34b and 34c, the third tape head may complete laydown of ply segment 34d and remain idle for a period while the first and second tape heads complete their tasks of laying down ply segments 34a, 34b and 34c. This idle time represents inefficiency and effectively increases the total time required to complete the layup of the sequence 32c. It would be desirable to have the task load essentially evenly balanced over all of the tape heads 22 so that all of the tape heads 22 are constantly working on completing the ply segments 34a, 34b, 34c, and 34d until the sequence 32c is completed.

It is known that: by adding machines (tape heads) working in parallel with each other ("parallel processing"), the automated layup process may be speeded up However, the overall layup time using multiple tape heads operating in parallel with each other is limited by the time required by the slowest tape head to complete its layup tasks. This speed limitation is the subject of Amdahl's Law which holds that the maximum speedup S that can be expected from parallel processing given the proportion of parts that must be computed sequentially is:

$$S \le \frac{1}{f + (1-f)/N}$$

where,
f is the fraction of the problem that must be computed sequentially, and
N is the number of processors.

Note that as f approaches zero, S nears N.

Figure 6:
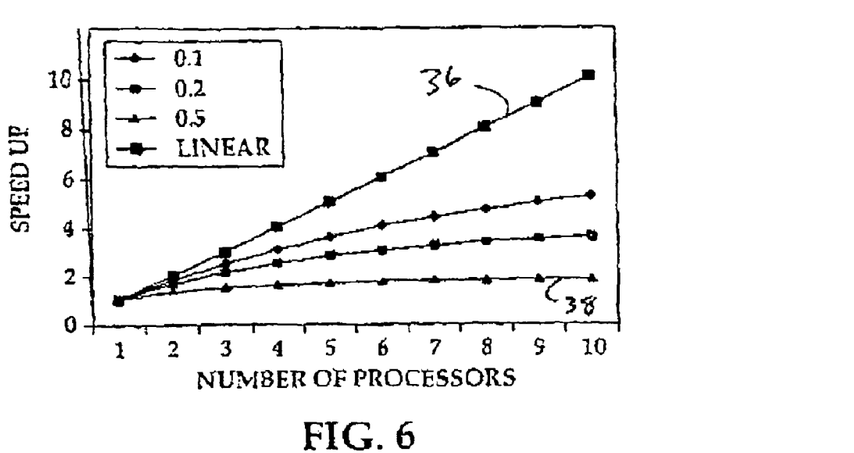
FIG. 6 is a graph illustrating a mathematical principal limiting maximum speedup obtained from the use of parallel processors.

FIG. 6 graphically illustrates the principals of Amdahl's Law. The speedup of an operation using multiple processors (tape heads) in parallel is limited by the sequential fraction of the operation. For example, if 0.5 portion of the operation is sequential, the theoretical maximum speedup using parallel computing would be 2 as shown by curve 38, regardless of the number of processors (tape heads) that are used. Curve 36 represents the linear relationship between the number of processors and speedup of an operation in the absence of the limitation imposed by Amdahl's Law.

In accordance with the disclosed embodiments, the speedup limitation discussed above may be overcome by increasing the efficiency of the parallel processing provided by multiple tape heads 22 operating simultaneously to layup a sequence 32. In mathematical terms, the method utilizes a form of domain decomposition which is achieved by distributing the computational domain of the problem across nodes. Each node is given some subset of the data on which to work. Functional decomposition is achieved by having nodes execute different portions of the same code simultaneously. Each node performs a specific subtask in the solution. Applying this principle to multi-head tape layup operations, a task assignment optimizer program 66 (FIG. 10) is used to analyze the shape of each sequence 32 represented by a CAD (computer aided design) file. Where a sequence 32 is made up of many ply segments 34, the sequence 32 is partitioned into several groups (sub-domains) of ply segments 34 may allow each tape head 22 to operate independently and simultaneously on their assigned group. Optimal load balancing among multiple tape heads 22 may assure high parallel efficiency, achieved through minimizing the idle time for each tape head 22, and a higher laydown rate.

In the case of a sequence 32 such as sequence 32a shown in FIG. 3, containing only one relatively complex ply segment 34, the optimizer program 66 analyzes the programmed tape head paths generated by a path generation program 68 (FIG. 10), and assigns the courses for these paths to available tape heads 22 with optimal ordering and balance of the load being achieved between the multiple tape heads 22. Thus, the optimizer program 66 functions to analyze the various ply segments of a given sequence, partitions the task of laying down each ply segment and then assigns tape heads 22 to the partitioned tasks that result in minimum overall lay-up time.

Figure 1:
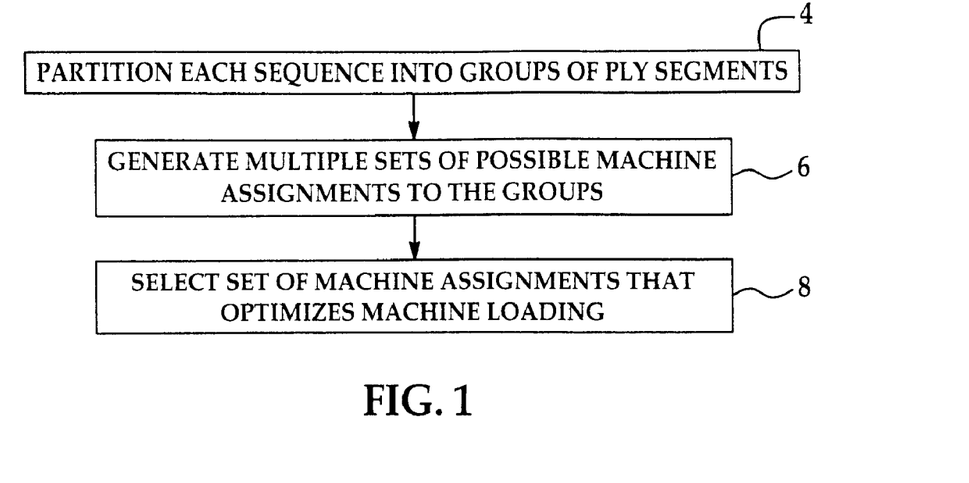
FIG. 1 is a flow diagram showing the steps of one method embodiment for optimizing task assignment for multi-head tape laydown

FIG. 1 illustrates the basic steps of one method embodiment for optimizing the loading on a plurality of the automated tape application machines 20. Beginning at step 4, each ply sequence 32 may be partitioned into groups of ply segments 34. The method continues at step 6, with the generation of multiple sets of possible machine assignments to the groups, wherein for each group at least one of the machines is assigned to layup the ply segments 34 in the group. Finally, at step 8, one of the sets of possible machine assignments is selected that optimizes the loading on the machines 20.

Figure 1A:
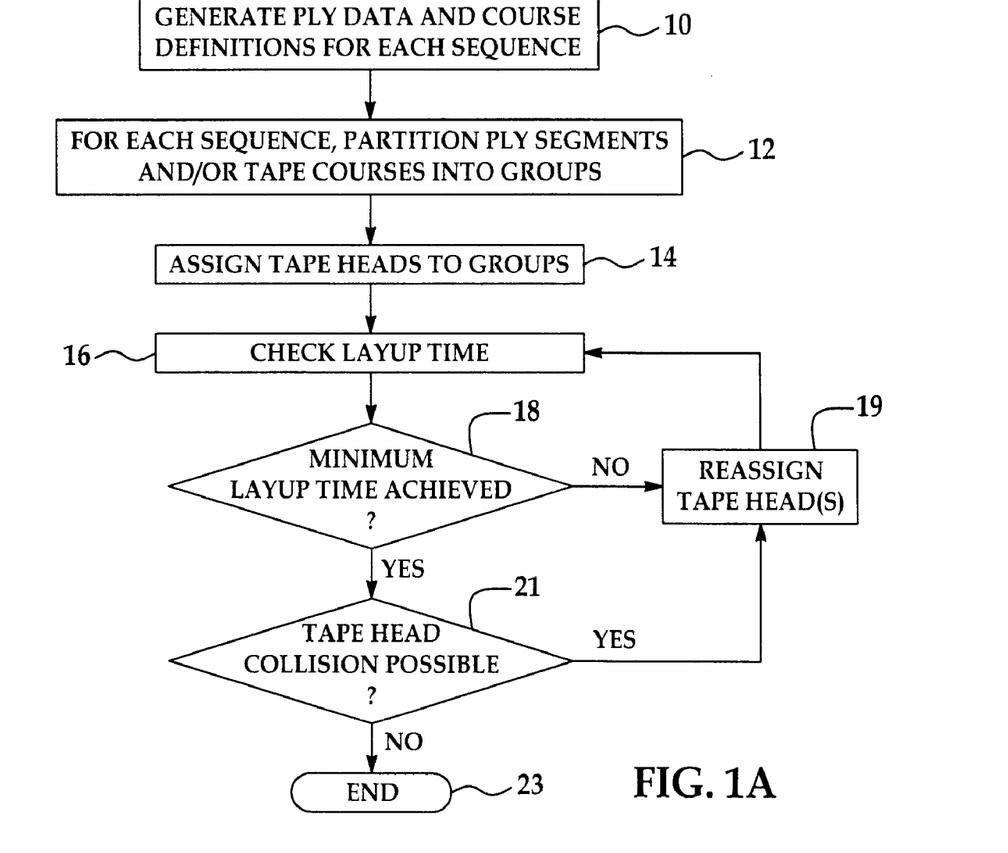
FIG. 1a is a flow diagram showing the steps of another method embodiment for optimizing task assignment for multi-head tape laydown.

The basic steps of another method embodiment are shown in FIG. 1a. Beginning at step 10, ply data and course definitions for each sequence 32 are generated. This ply data includes the boundary locations for ply segments 34 and the location and direction of each tape course 44 forming the ply segments 34. Then, at step 12, each sequence 32 is partitioned either at the ply segment level or at the tape course level, into groups. Each group includes one or more ply segments 34 or tape courses, depending on the level at which partitioning is performed.

At step 14, the individual tape heads 22 are assigned to the groups, i.e., the individual tape heads 22 are assigned to layup ply segments 34 within their assigned group or tape courses 44 within their assigned group. Based on the assignment made at step 14, a check is made at step 16 to determine the total length of time required to layup the composite structure based on the assignment made at 14. Using the check made at 16, a determination is made at 18 of whether the checked layup time represents the minimum layup time. If the minimum layup time has not been achieved, the process proceeds to step 19, where one or more of the tape heads 22 are reassigned to the groups, following which steps 16 and 18 are repeated. When the minimum layup time has been achieved as determined at step 18, the process proceeds to step 21 where a determination is made of whether a possibility exists that, based on the current tape head assignments, two or more of the tape heads 22 may collide with each other. If a collision may be possible, then the process returns to step 19, where one or more of the heads are reassigned to avoid the possibility of a collision. Following the reassignment, steps 16 and 18 are repeated until the minimum layup time has been achieved. When the minimum layup time has been achieved and it has been determined that are is no possibility of tape head collisions, then the process ends at 23.

Figure 7:
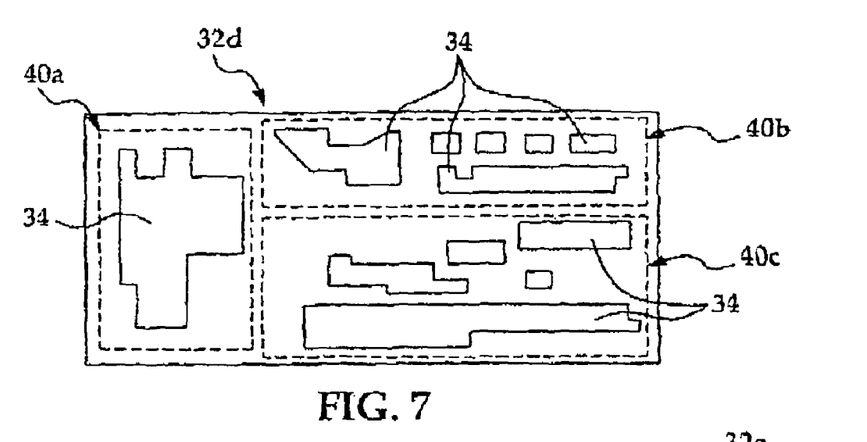
FIG. 7 is a plan view illustrating the partitioning of ply segments into groups according to one embodiment.

FIG. 7 illustrates a sequence 32d that has been partitioned into groups 40a, 40b, 40c of ply segments 34. A group such as group 40a may have only a single ply segment 34, or a group may have multiple ply segments 34, such as groups 40b and 40c. Each of the tape heads 22 is assigned to one of the groups 40a, 40b 40c to laydown the tape courses for that assigned group. The partitioning of the sequence 32d and the assignment of the tape heads 22 is performed in a manner such that the load on the tape heads 22 used to laydown the sequence 32d is essentially balanced.

Figure 8:
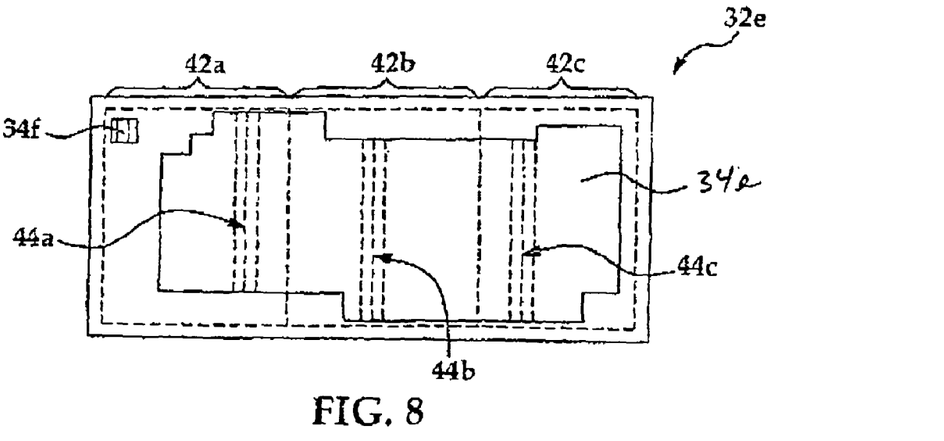
FIG. 8 is a plan view illustrating the partitioning of tape courses into groups according to another embodiment.

FIG. 8 illustrates a sequence 32e that has been partitioned into groups 42a, 42b, 42c of respectively associated tape courses 44a, 44b, 44c. The sequence 32e includes only two ply segments 34e and 34f. Ply segment 34e is a large and complex, while ply segment 34f is small and simple. In the case of this sequence 32e, the optimizer program 66 may opt to assign the tape heads 22 respectively to the groups 42a, 42b, 42c of tape courses 44a, 44b, 44c.

Figure 9:
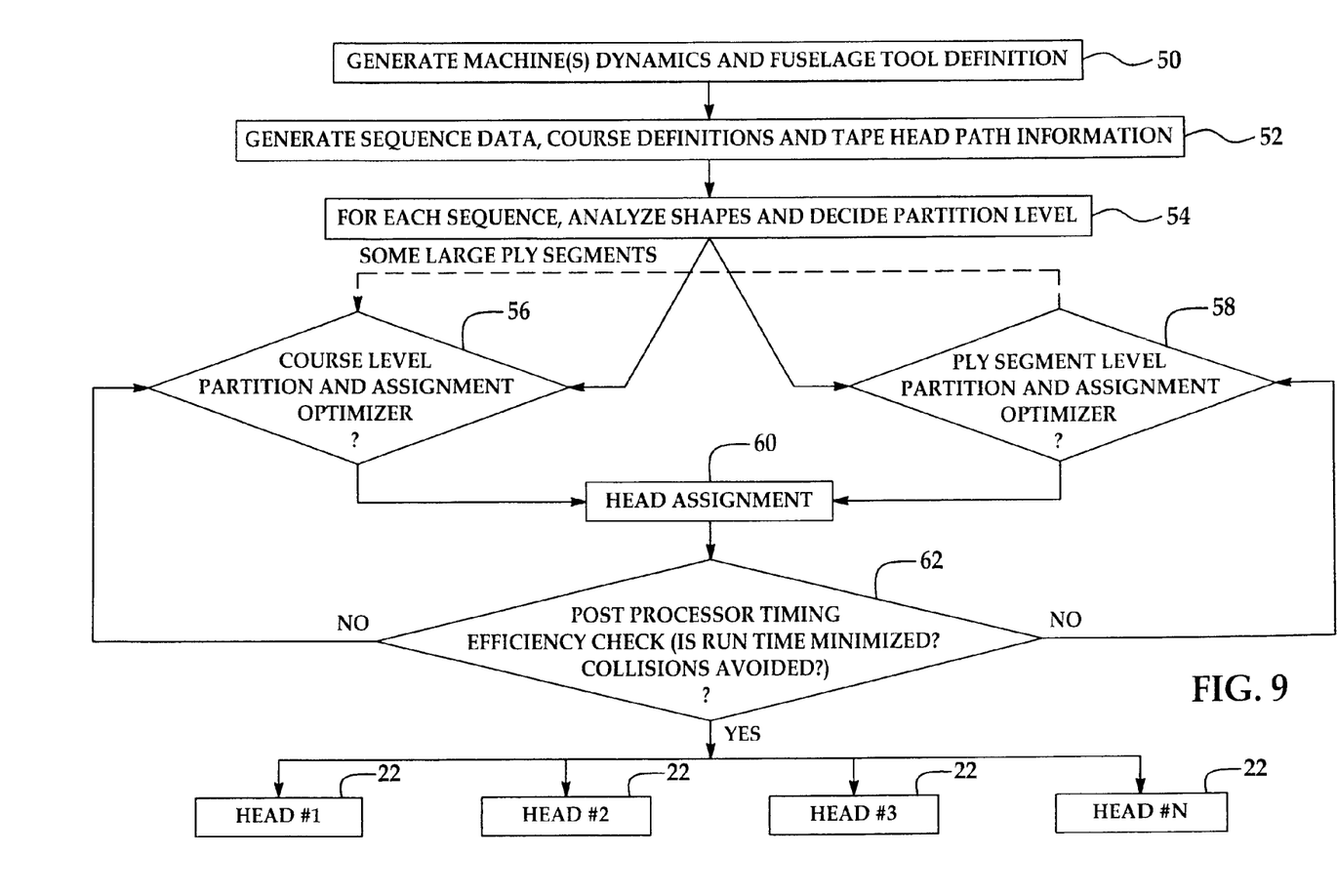
FIG. 9 is a flow diagram illustrating steps of a method embodiment.

Additional details of a method embodiment are illustrated in FIG. 9. Beginning at step 50, information is gathered relating to the tape head machines, including the number of machines, their characteristics and dynamics. Also, information is gathered that defines the tooling used for forming the layup, which in the illustrate example comprises the fuselage mandrel 28 (FIG. 2). Next, at 52, information is input relating to each sequence of the layup, including data relating to the ply segments and tape courses. This information may be derived from CAD files, for example, and will usually define the layout (boundaries) of ply segments and the tape courses required to layup these ply segments.

At step 54, for each sequence of the layup, the shapes of the ply segments are analyzed, and a determination is made as to what level of partitioning is appropriate. In some cases, it may be desirable to partition a sequence at the ply segment level, while in other applications it may be desirable to partition the sequence at the tape course level. Once a determination is made as to the partition level at step 54, the method proceeds to steps 56 and 58, depending upon the partition level that has been selected. If the tape course level has been selected, then the tape courses are partitioned at step 56, whereas if ply segment partitioning has been selected, then the ply segments are partitioned at step 58. In some applications, where a sequence contains one or more ply segments such as sequence 32a shown in FIG. 3, partitioning at both the ply segment level and course level may be performed.

Next, at step 60, the individual tape heads 22 are assigned to the partitioned ply segments and/or tape courses in a manner that attempts to even out (balance) the load on the available tape heads 22. Then, at step 62, an efficiency check is performed which comprises calculating the time that would be required to layup the sequence that has been analyzed in step 54. If the run time has not been minimized, then steps 56, 58 and 60 are repeated, in which the ply segments and tape courses may be repartitioned, and the tape heads are reassigned at step 60. The process of checking the runtime, repartitioning and reassigning tape heads is repeated until the runtime has been minimized. Also, as part of step 62, a check is made to determine whether the head assignment 60 may result in physical collision of any of the tape heads 22. This collision check may be performed simply by determining whether the programmed paths of the tape heads may intersect at the same point in time. If a collision may be possible, steps 56, 58 and/or step 60 are repeated so that the tape heads 22 are reassigned in a manner that avoids the potential head collision. Finally, if no possible collisions are determined, and the run time has been minimized, then the final task assignments are given to the individual tape heads 22.

Referring now to FIG. 10, the task assignment optimizer program 66 generates the programmed instructions used by the NC controller 64 based on a set of CAD files 72 which may define a composite structure in terms of sequences containing ply segments of composite tape. The task assignment optimizer program 66 functions to optimize the tape head assignments based on the data provided by a path generation program 68. The NC controller 64 controls motions of multiple tape head 22 as well as other machine functions such as tapefeed, tape cut-off etc.

As previously mentioned, the sequences generally represent layers of a composite material that forms the composite structure, and ply segments generally represent a region of a composite material layer. In the CAD data format, for example, each ply segment may be modeled as a boundary on a complex surface, with associated material and orientation properties. A CAD file interface 70 may be used to convert the composite part definition data format unique to a specific CAD system that is compatible with a path generation program 68. Based on the composite structure surface definition and ply definitions, the path generation program 68 produces a set of programmed instructions that define the paths to be followed by the tape heads 22. The path generation program 68 may be similar to that disclosed in U.S. patent application Ser. No. 11/269,905 filed Nov. 9, 2005; U.S. patent application Ser. No. 11/315,101 filed Dec. 23, 2005 and published as US-2007-0144676-A1 on Jun. 28, 2007; and U.S. patent application Ser. No. 11/315,103, filed Dec. 23, 2005 and published as US-2007-0150087-A1 on Jun. 28, 2007, the entire disclosures of which are incorporated by reference herein.

A computer 74 may be used to modify or access the optimizer program 66 or to alter the data provided by the path generation program 68. The computer 74 may be provided with operator input/output device 76, which may comprise, for example, without limitation, a keyboard and/or display.

Figure 11:
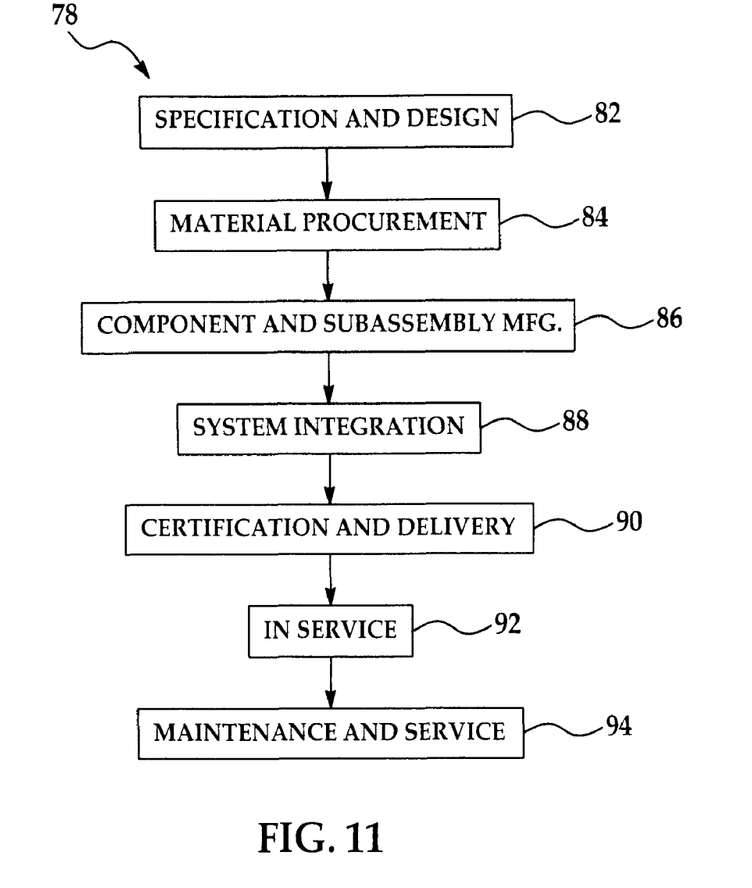
FIG. 11 is a flow diagram of aircraft production and service methodology.
Figure 12:
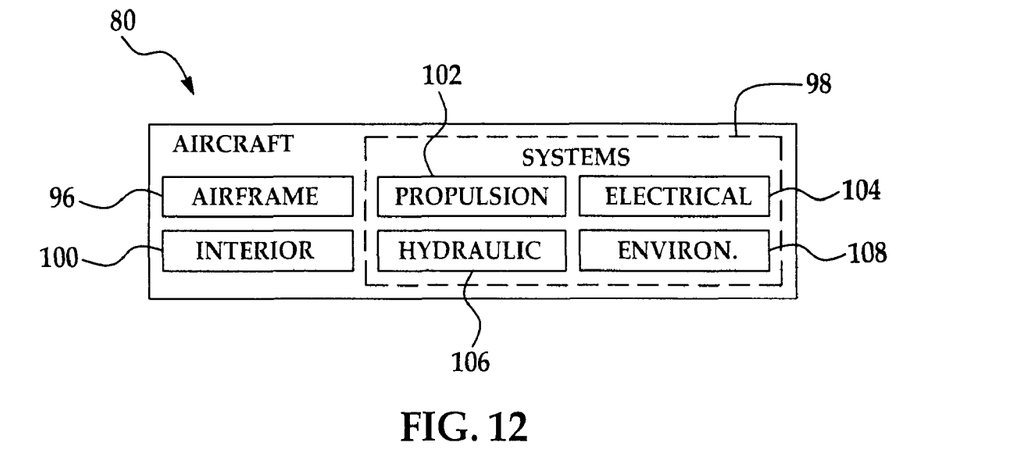
FIG. 12 is a block diagram of an aircraft.

Embodiments of the disclosure may find use in a variety of potential applications, particularly in the transportation industry, including for example, aerospace and automotive applications. Thus, referring now to FIGS. 11 and 12, embodiments of the disclosure may be used in the context of an aircraft manufacturing and service method 78 as shown in FIG. 11 and an aircraft 80 as shown in FIG. 12. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 78 may include specification and design 82 of the aircraft 80 and material procurement 84. During production, component and subassembly manufacturing 86 and system integration 88 of the aircraft 80 takes place. Thereafter, the aircraft 80 may go through certification and delivery 90 in order to be placed in service 92. While in service by a customer, the aircraft 80 is scheduled for routine maintenance and service 94 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 80 produced by exemplary method 78 may include an airframe 96 with a plurality of systems 98 and an interior 100. Examples of high-level systems 98 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

Apparatus and methods embodied herein may be employed during any one or more of the stages of the production and service method 78. For example, components or subassemblies corresponding to production process 86 may be fabricated or manufactured in a manner similar to components or subassemblies produced while the aircraft 80 is in service. Also, one or more apparatus embodiments, method embodiments, or a combination thereof may be utilized during the production stages 86 and 88, for example, by substantially expediting assembly of or reducing the cost of an aircraft 80. Similarly, one or more of apparatus embodiments, method embodiments, or a combination thereof may be utilized while the aircraft 80 is in service, for example and without limitation, to maintenance and service 94.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of optimizing the loading on a plurality of automated composite tape application machines laying down said tape simultaneously with respect to one another to layup a composite structure in ply sequences, wherein each ply sequence includes ply segments formed by laying down courses of said composite tape, comprising the steps of:
    (A) partitioning each sequence into groups of ply segments;
    (B) generating multiple sets of possible machine assignments to the groups, wherein for each group at least one of the machines is assigned to layup the ply segments in the group; and, (C) selecting one of the sets of said possible machine assignments generated in step (B) that optimizes the loading on the machines, said optimized loading comprising minimizing an idle time for each of the machines.

2. The method of claim 1, further comprising the step of:

(D) determining the time required to complete layup of a ply sequence using each of the sets of possible machine assignments generated in step (B).

3. The method of claim 1, further comprising the step of:

(D) determining whether any of the machines may collide with each other based on the set of possible machine assignments selected in step (B).

4. The method of claim 3, further comprising the step of:

(E) changing at least one of the machine assignments in the set selected in step (C) to avoid the possibility of a machine collision.

5. The method of claim 1, further comprising the steps of:

(D) partitioning at least one of the ply segments in a group into subgroups of tape courses, and wherein step (B) includes assigning at least two of the machines to layup the tape courses in the subgroups.

6. The method of claim 1, further comprising the step of:

(D) generating ply data representing the layout of ply segments and tape courses in each of the ply sequences.

7. The method of claim 1, further comprising the step of:

(D) generating a set of programmed instructions for controlling the movements of the machines based on the selection made in step (C).

8. The method of claim 1, wherein said composite structure comprises an aircraft subassembly.

9. The method of claim 1, wherein said composite structure comprises an aircraft.

10. The method of claim 1, wherein said composite structure comprises a vehicle assembly.

* * * * *